(12) United States Patent
Kimura

(10) Patent No.: US 7,711,209 B2
(45) Date of Patent: May 4, 2010

(54) IMAGE EXPANSION APPARATUS AND IMAGE EXPANSION METHOD

(75) Inventor: Tadayoshi Kimura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/368,119

(22) Filed: Feb. 9, 2009

(65) Prior Publication Data

US 2009/0324130 A1 Dec. 31, 2009

(30) Foreign Application Priority Data

Jun. 25, 2008 (JP) .............................. 2008-166359

(51) Int. Cl.
*G06K 9/32* (2006.01)
(52) U.S. Cl. .................. 382/300; 348/441; 358/525; 708/290; 708/313; 708/847; 345/606
(58) Field of Classification Search ................. 382/299, 382/300; 348/441–459; 358/525; 708/290, 708/313, 847; 345/606–610
See application file for complete search history.

(56) References Cited

U.S. PATENT DOCUMENTS

| | | | |
|---|---|---|---|
| 5,019,903 A | 5/1991 | Dougall et al. | |
| 5,602,654 A | 2/1997 | Patti et al. | |
| 5,875,268 A | 2/1999 | Miyake | |
| 6,731,342 B2 * | 5/2004 | Shin et al. | 348/452 |
| 7,218,354 B2 * | 5/2007 | Tanaka | 348/448 |
| 2001/0008425 A1 * | 7/2001 | Shin et al. | 348/452 |
| 2005/0110901 A1 | 5/2005 | Alfonso et al. | |
| 2005/0212961 A1 | 9/2005 | Matsuzaki et al. | |
| 2006/0152621 A1 | 7/2006 | Orlick | |
| 2008/0043141 A1 | 2/2008 | Namioka | |
| 2008/0239146 A1 * | 10/2008 | Namioka | 348/452 |
| 2008/0279479 A1 * | 11/2008 | Liang et al. | 382/300 |

FOREIGN PATENT DOCUMENTS

| | | |
|---|---|---|
| JP | 02-293793 | 12/1990 |
| JP | 07-105359 | 4/1995 |
| JP | 08-023481 | 1/1996 |

(Continued)

OTHER PUBLICATIONS

Decision of Patent Grant with English translation in a corresponding Japanese application, application No. 2008-166359 dated Jun. 5, 2009.

*Primary Examiner*—Aaron W Carter
(74) *Attorney, Agent, or Firm*—Blakely, Sokoloff, Taylor & Zafman LLP

(57) ABSTRACT

According to one embodiment, a first correlation calculator calculates a correlation between first pixel blocks, and detects as first reference pixels actual pixels contained respectively in the first pixel blocks with the highest correlation. A second correlation calculator calculates a correlation between second pixel blocks, and detects as second reference pixels actual pixels contained respectively in the second pixel blocks with the highest correlation. The first pixel blocks include pixels arranged in a plurality of rows and columns The second pixel blocks include pixels arranged in at least one row less than the rows of the first pixel blocks and a plurality of columns. An interpolation calculator calculates, when the first reference pixels are located perpendicular to the actual pixel lines, the pixel value of the interpolation pixel based on the second reference pixels.

5 Claims, 14 Drawing Sheets

FOREIGN PATENT DOCUMENTS

| | | |
|---|---|---|
| JP | 11-177940 | 7/1999 |
| JP | 2002-112203 | 4/2002 |
| JP | 2005-191969 | 7/2005 |
| JP | 2006-060375 | 3/2006 |
| JP | 2007-060104 | 3/2007 |
| JP | 2008-011389 | 1/2008 |

* cited by examiner

IMAGE EXPANSION APPARATUS AND IMAGE EXPANSION METHOD

CROSS-REFERENCE TO RELATED APPLICATIONS

This application is based upon and claims the benefit of priority from Japanese Patent Application No. 2008-166359, filed Jun. 25, 2008, the entire contents of which are incorporated herein by reference.

BACKGROUND

1. Field

One embodiment of the invention relates to an image expansion apparatus that expands an image by pixel interpolation and a method thereof.

2. Description of the Related Art

An image expansion apparatus is used in, for example, a digital television apparatus, to enlarge a digital image. Such an image expansion apparatus creates a new pixel line between already existing pixel lines, thereby enlarging a digital image. Upon creating the new pixel line, the image expansion apparatus calculates a pixel value of a pixel to be interpolated based on pixel values of already existing pixels.

As an example of such an image expansion apparatus, Japanese Patent Application Publication (KOKAI) No. 2007-60104 discloses an interpolation pixel generating apparatus that generates an interpolation pixel to be interpolated at a position based on an input image containing a plurality of input pixels. More specifically, the interpolation pixel generating apparatus calculates, based on the input image, an autocorrelation value in a range including the position with respect to each of a plurality of directions from the position. The interpolation pixel generating apparatus then detects a direction with a maximum autocorrelation value, and, based on the input image, generates the interpolation pixel using an interpolation filter corresponding to the direction with the maximum autocorrelation value.

When the pixel value of a newly generated pixel is obtained based on the pixel values of pixels located in a diagonal direction with respect to the new pixel, the pixel value may be erroneously interpolated. Especially, when an edge extends at an angle in an image and the angle is large, the edge may be jagged (so-called "jaggies" may occur along the edge).

BRIEF DESCRIPTION OF THE SEVERAL VIEWS OF THE DRAWINGS

A general architecture that implements the various features of the invention will now be described with reference to the drawings The drawings and the associated descriptions are provided to illustrate embodiments of the invention and not to limit the scope of the invention.

DETAILED DESCRIPTION

Figure 1:
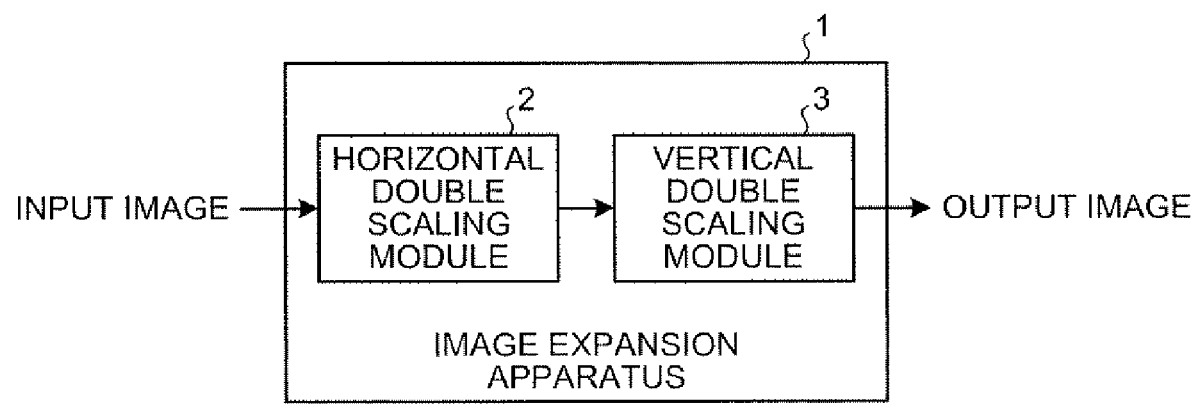
FIG. 1 is an exemplary schematic diagram of an image expansion apparatus according to an embodiment of the invention.

Various embodiments according to the invention will be described hereinafter with reference to the accompanying drawings. In general, according to one embodiment of the invention, an image expansion apparatus comprises: a first correlation calculator configured to calculate a first correlation between first pixel blocks, and detect as first reference pixels a pair of actual pixels contained respectively in the first pixel blocks where the first correlation is the highest, the actual pixels being located on a pair of actual pixel lines extending on both sides of an interpolation pixel, respectively, and being opposite with respect to the interpolation pixel and separated from the interpolation pixel by substantially an equal distance; a second correlation calculator configured to calculate a second correlation between second pixel blocks, and detect as second reference pixels a pair of actual pixels contained respectively in the second pixel blocks where the second correlation is the highest; and an interpolation calculator configured to calculate a pixel value of the interpolation pixel based on either pixel values of the first reference pixels or pixel values of the second reference pixels. The first pixel blocks each include pixels arranged in a plurality of rows and columns, and the second pixel blocks each include pixels arranged in at least one row less than the rows of the first pixel blocks and a plurality of columns, the rows being arranged in parallel to the actual pixel lines, while the columns being arranged perpendicular to the actual pixel lines. The interpolation calculator is configured to calculate, when the first reference pixels are located perpendicular to the actual pixel lines, the pixel value of the interpolation pixel based on the pixel values of the second reference pixels.

According to another embodiment of the invention, an image expansion method comprises calculating a first correlation between first pixel blocks, and detecting as first reference pixels a pair of actual pixels contained respectively in the first pixel blocks where the first correlation is the highest, the actual pixels being located on a pair of actual pixel lines extending on both sides of an interpolation pixel, respectively, and being opposite with respect to the interpolation pixel and separated from the interpolation pixel by substantially an equal distance; calculating a second correlation between second pixel blocks, and detecting as second reference pixels a pair of actual pixels contained respectively in the second pixel blocks where the second correlation is the highest; and calculating a pixel value of the interpolation pixel based on either pixel values of the first reference pixels or pixel values of the second reference pixels. The first pixel blocks each include pixels arranged in a plurality of rows and columns, and the second pixel blocks each include pixels arranged in at least one row less than the rows of the first pixel blocks and a plurality of columns, the rows being arranged in parallel to the actual pixel lines, while the columns being arranged perpendicular to the actual pixel lines. When the first reference pixels are located perpendicular to the actual pixel lines, the pixel value of the interpolation pixel is calculated based on the pixel values of the second reference pixels.

FIG. 1 is a schematic diagram of an image expansion apparatus 1 according to an embodiment of the invention. As illustrated in FIG. 1, upon receipt of an image input thereto, the image expansion apparatus 1 expands the input image in the horizontal direction and the vertical direction, and outputs the expanded image as an output image. The image expansion apparatus 1 comprises a horizontal double scaling module 2 and a vertical double scaling module 3. The horizontal double scaling module 2 enlarges an input image to double the size in the horizontal direction. The vertical double scaling module 3 enlarges the input image to double the size in the vertical direction.

Figure 2:
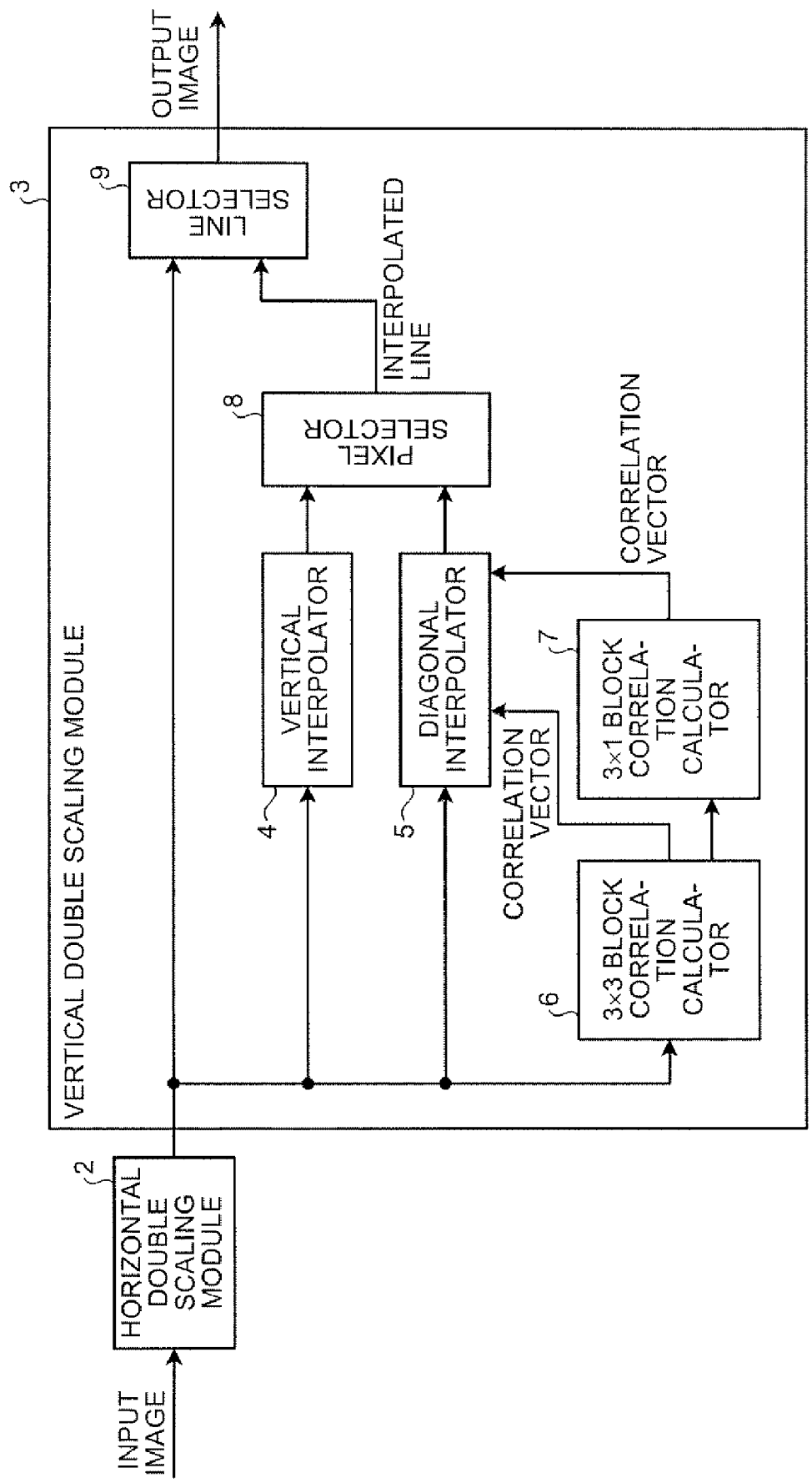
FIG. 2 is an exemplary block diagram of a vertical double scaling module of the image expansion apparatus in the embodiment.

FIG. 2 is a block diagram of the vertical double scaling module 3. The vertical double scaling module 3 comprises a vertical interpolator 4, a diagonal interpolator (interpolation calculator) 5, a 3×3 block correlation calculator (first correlation calculator) 6, a 1×3 block correlation calculator (second correlation calculator) 7, a pixel selector 8, and a line selector 9.

Figure 3:
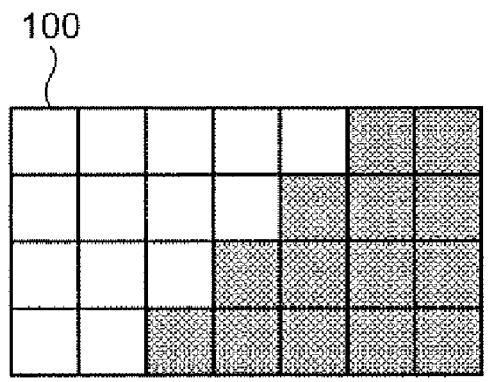
FIG. 3 is an exemplary schematic diagram of an image input to the image expansion apparatus in the embodiment.
Figure 4:
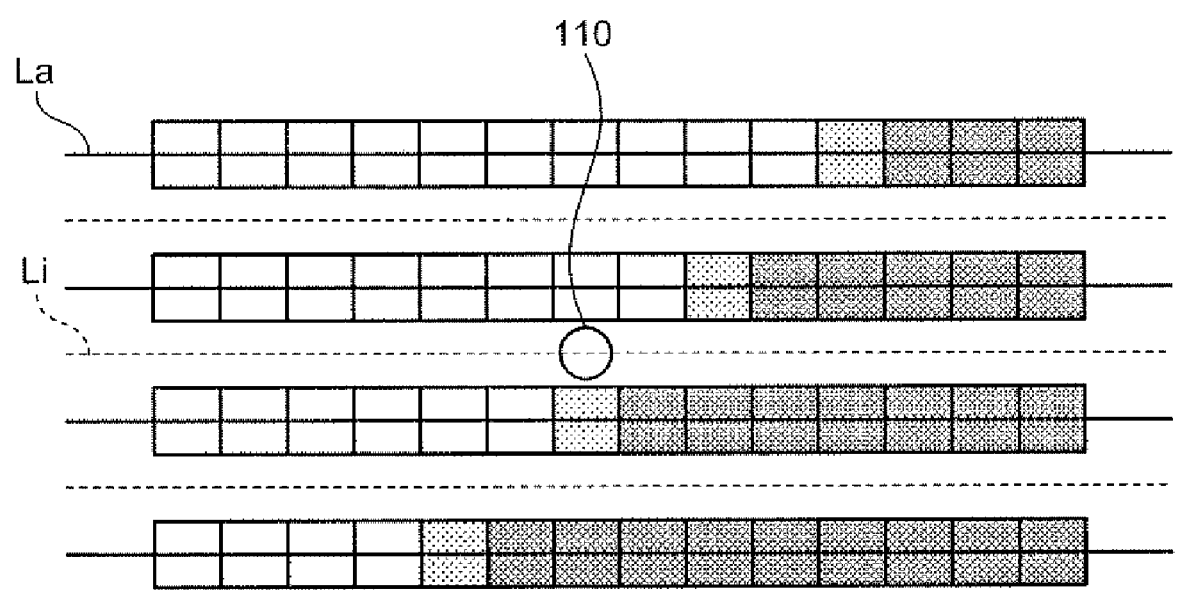
FIG. 4 is an exemplary schematic diagram of a converted input image in the embodiment.

For example, when the image expansion apparatus 1 receives an input image 100 as illustrated in FIG. 3, the horizontal double scaling module 2 creates a new vertical pixel line between existing vertical pixel lines. Thus, the input image 100 is converted by the horizontal double scaling module 2 as illustrated in FIG. 4. Then, the vertical double scaling module 3 creates a new horizontal pixel line (interpolation line) Li indicated by a dotted line between existing horizontal pixel lines (actual pixel lines) La indicated by solid lines.

In the embodiment, the vertical double scaling module 3 uses vertical interpolation and diagonal interpolation in combination. In the vertical interpolation, the pixel value of an interpolation pixel 110 is calculated based on the pixel value (luminance value) of at least one pixel (actual pixel) located in the vertical direction with respect to the interpolation pixel 110. In the diagonal interpolation, the pixel value of the interpolation pixel 110 is calculated based on the pixel value of at least one pixel located in the diagonal direction with respect to the interpolation pixel 110. In the following, the pixel value of each pixel will be described as a luminance value; however, the pixel value may be a color value.

Figure 5:
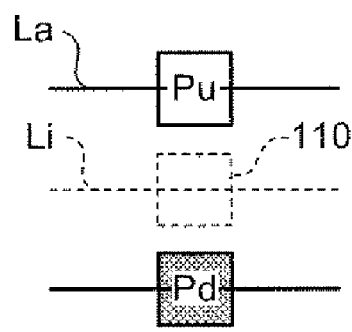
FIG. 5 is an exemplary schematic diagram for illustrating vertical interpolation in the embodiment.
Figure 6:
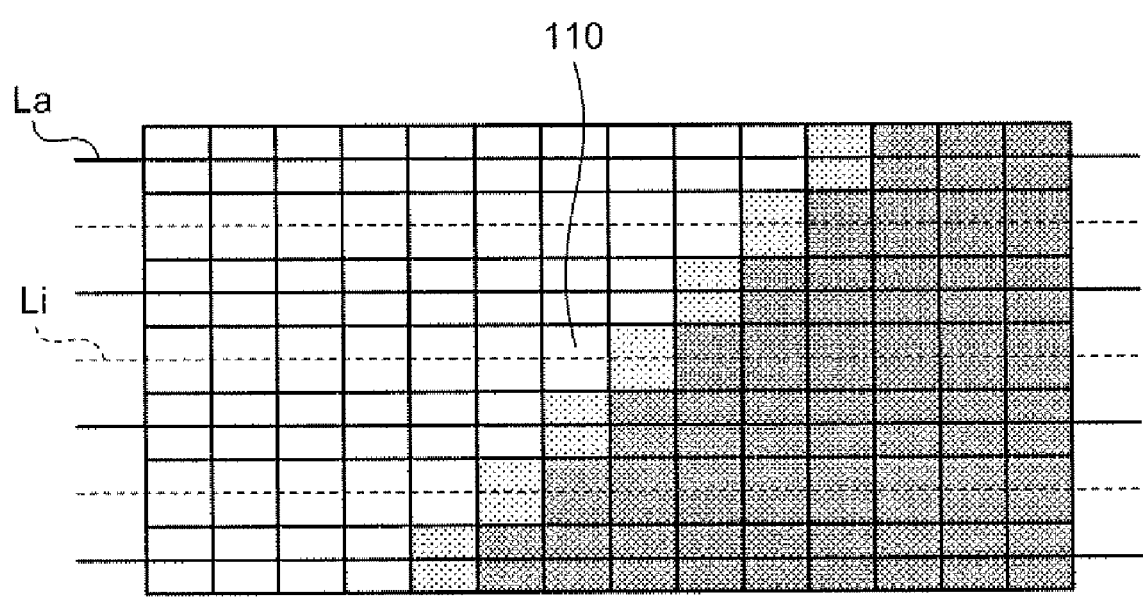
FIG. 6 is an exemplary schematic diagram of an ideal interpolation state in the embodiment.
Figure 7:
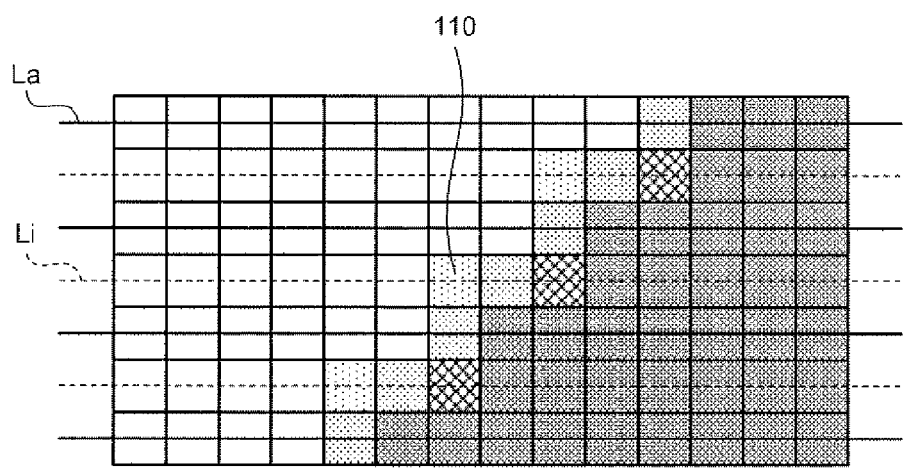
FIG. 7 is an exemplary schematic diagram of an interpolation state obtained by vertical interpolation in the embodiment.

With reference to FIGS. 5 to 7, a description will be given of the vertical interpolation performed by the vertical double scaling module 3. Specifically, the vertical interpolation is performed by the vertical interpolator 4 of the vertical double scaling module 3.

As illustrated in FIG. 5, in the vertical interpolation, the luminance value of the interpolation pixel 110 is calculated based on a luminance value Pu of a pixel thereabove and a luminance value Pd of a pixel therebelow. More specifically, the luminance value of the interpolation pixel 110 is obtained by an interpolation method, such as linear interpolation and cubic convolution interpolation, based on the luminance value Pu of the pixel thereabove and the luminance value Pd of the pixel therebelow.

It is desirable that the input image illustrated in FIG. 4 be interpolated as illustrated in FIG. 6 to have a clear edge between the high luminance area and the low luminance area. With only the vertical interpolation, however, the luminance value of the interpolation pixel 110 becomes an intermediate value as illustrated in FIG. 7, and the image has a jagged edge, called "jaggies", between the high luminance area and the low luminance area. To achieve desired interpolation with less jaggies, the embodiment employs the vertical interpolation and diagonal interpolation in combination.

With reference to FIGS. 8 to 13, a description will be given of the first example of the diagonal interpolation (hereinafter, "diagonal interpolation 1" performed by the vertical double scaling module 3. Specifically, the diagonal interpolation 1 is performed by the diagonal interpolator 5 and the 3×3 block correlation calculator 6 of the vertical double scaling module 3.

Figure 8:
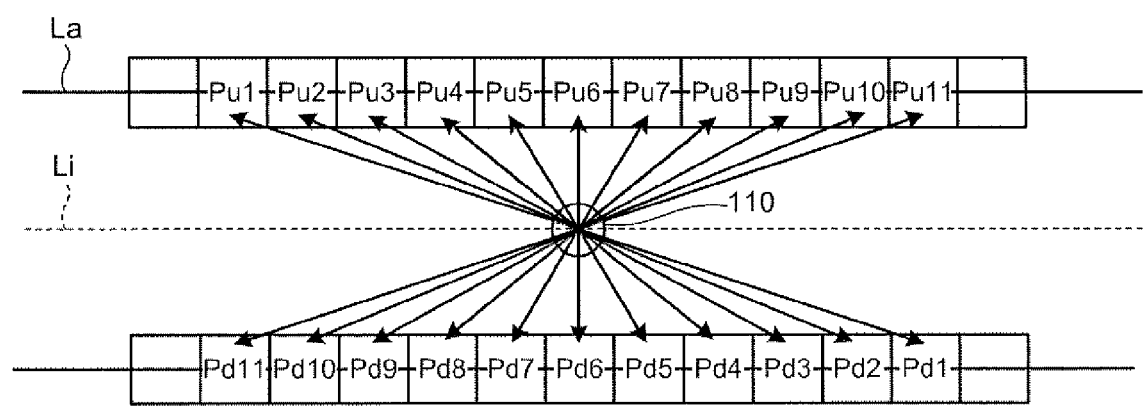
FIGS. 8 to 21 are exemplary schematic diagrams for explaining diagonal interpolation in the embodiment.

In the diagonal interpolation 1, as illustrated in FIG. 8, the luminance value of the interpolation pixel 110 is calculated based on the luminance values Pu1 to Pu11 of 11 pixels arrayed above the interpolation pixel 110, and the luminance values Pd1 to Pd11 of 11 pixels arrayed below the interpolation pixel 110.

Figure 9:
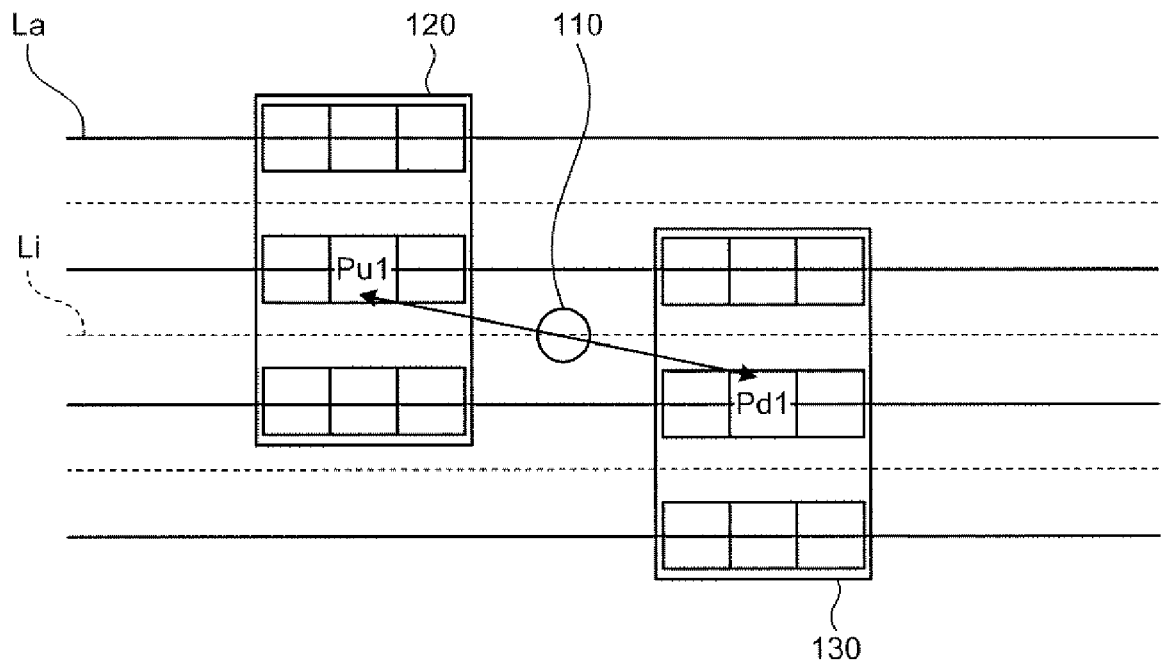
Figure 10:
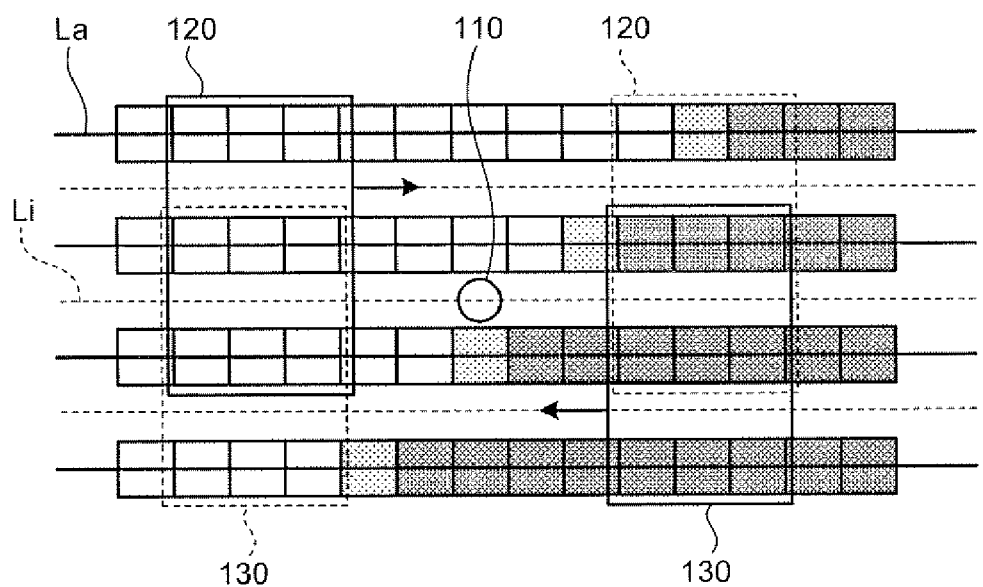

The 3×3 block correlation calculator 6 searches for two pixel blocks with the highest correlation in 11 directions. More specifically, as illustrated in FIG. 9, the 3×3 block correlation calculator 6 sets a pixel block (first pixel block) 120 on the upper left side of the interpolation pixel 110, and a pixel block (first pixel block) 130 on the lower right side thereof. Subsequently, as illustrated in FIG. 10, the 3×3 block correlation calculator 6 shifts the pixel block 120 in the horizontal direction to a position indicated by a broken line. Similarly, the 3×3 block correlation calculator 6 shifts the pixel block 130 in the horizontal direction to a position indicated by a broken line.

Figure 11:
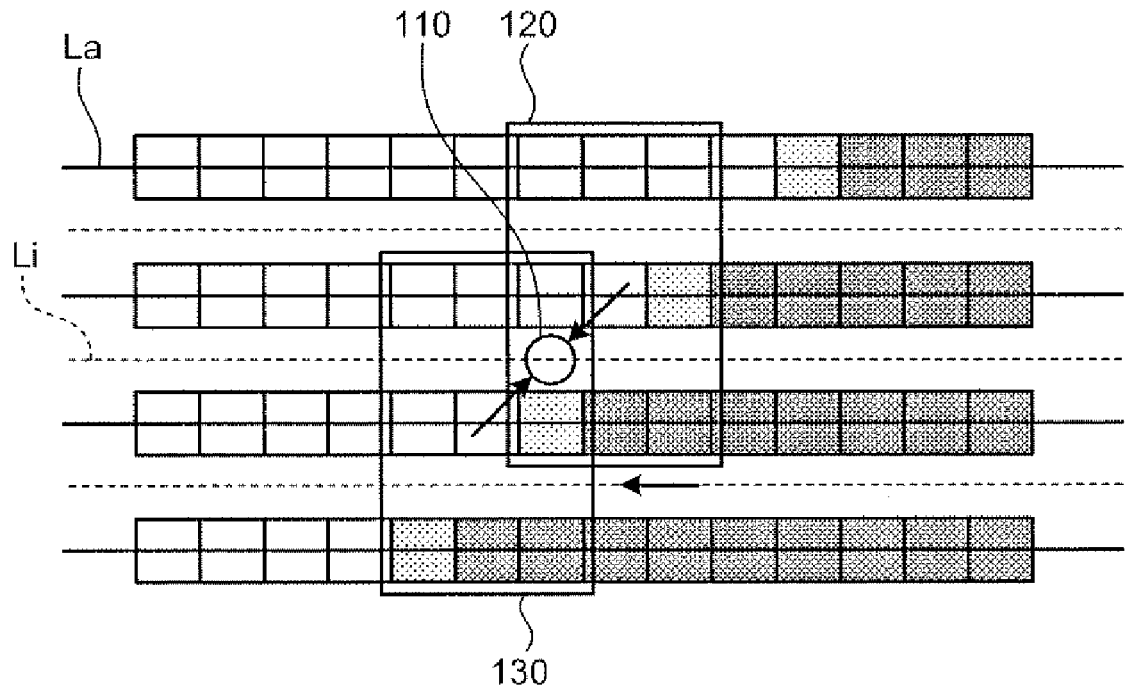

In the 11 directions, the pixel blocks 120 and 130, while being shifted, maintain the relationship that they are opposite with respect to the interpolation pixel 110, and that they are equally distant from the interpolation pixel 110. The 3×3 block correlation calculator 6 calculates a correlation between the pixel blocks 120 and 130 for each of the 11 directions in which they are shifted, and detects the direction in which the correlation between them is the highest. Thus, as illustrated in FIG. 11, the 3×3 block correlation calculator 6 determines the direction in which the correlation between the pixel blocks 120 and 130 is the highest. The 3×3 block correlation calculator 6 outputs information on the direction of the pixel blocks 120 and 130 thus determined as a correlation vector.

More specifically, the 3×3 block correlation calculator 6 calculates a difference between the luminance values of two pixels in corresponding positional relationship (e.g., pixels each located in the center of the uppermost row, pixels each located on the right side of the middle row, pixels each located on the left side of the lowermost row, etc.) in the pixel blocks 120 and 130. The 3×3 block correlation calculator 6 performs this calculation with respect to all pixels in the pixel blocks 120 and 130, and then calculates absolute values of all differences thus calculated. The 3×3 block correlation calculator 6 determines that the correlation between the pixel blocks 120 and 130 is the highest when the sum of the absolute values of the differences is minimum.

Figure 12:
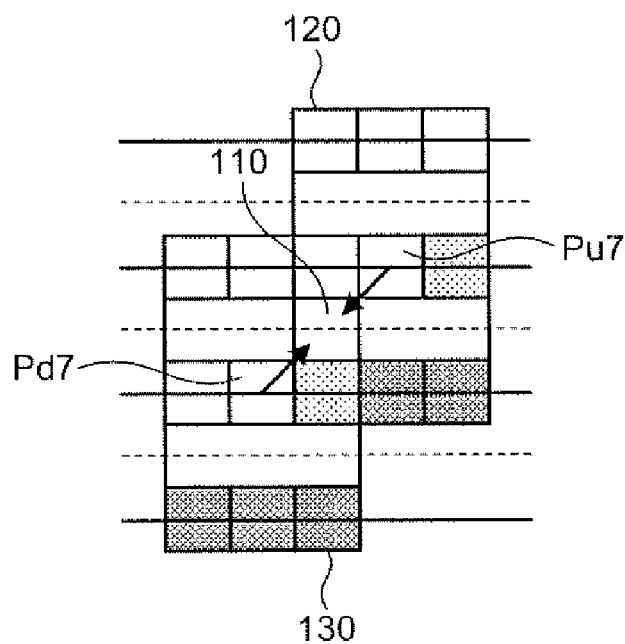
Figure 13:
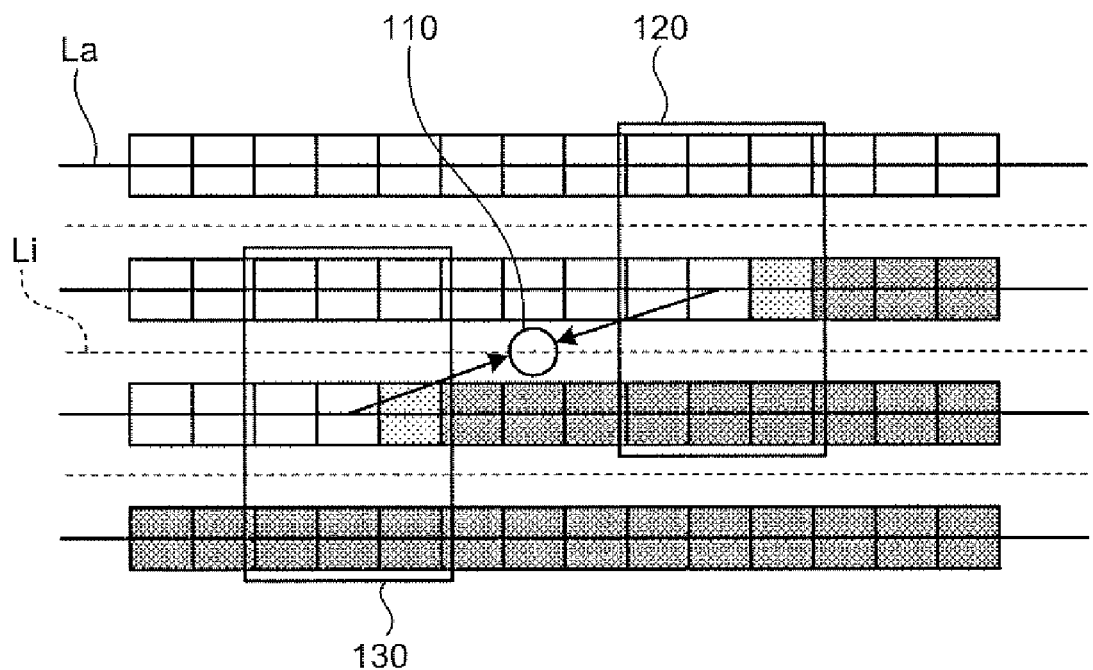

The diagonal interpolator 5 specifies the positions of the pixel blocks 120 and 130 based on the correlation vector calculated by the 3×3 block correlation calculator 6. Subsequently, the diagonal interpolator 5 calculates or interpolates the luminance value of the interpolation pixel 110 based on the pixel values of the pixel blocks 120 and 130 with the highest correlation (i.e., the pixel blocks 120 and 130 in the direction in which the correlation between them is the highest). More specifically, as illustrated in FIG. 12, the diagonal interpolator 5 calculates the average of the luminance value Pu7 of a pixel in the center of the pixel block 120 and the luminance value Pd7 of a pixel in the center of the pixel block 130 as the luminance value of the interpolation pixel 110. If, as illustrated in FIG. 13, the inclination angle of the edge is small, the luminance value of the interpolation pixel 110 is calculated by widening the range where the correlation is calculated in the horizontal direction.

As described above, the 3×3 block correlation calculator 6 sets the pixel blocks 120 and 130 each containing an actual pixel. The actual pixels are located on a pair of the horizontal pixel lines La extending on both sides of the interpolation pixel 110, respectively. The actual pixels are located opposite with respect to the interpolation pixel 110, and separated from the interpolation pixel 110 by substantially the same distance. The 3×3 block correlation calculator 6 calculates a correlation between the pixel blocks 120 and 130 for each of 11 directions. The 3×3 block correlation calculator 6 detects as reference pixels a pair of actual pixels (the pixels having the luminance values Pu7 and Pd7, respectively, in the above example) contained respectively in the pixel blocks 120 and 130 with the highest correlation. Then, the diagonal interpolator 5 calculates the luminance value of the interpolation pixel 110 based on the luminance values (the luminance values Pu7 and Pd7 in the above example) of the reference pixels detected by the 3×3 block correlation calculator 6.

Assuming that the row direction is horizontal and the column direction is vertical, the pixel blocks 120 and 130 are each a 3×3 (3 rows by 3 columns) matrix of pixels. That is, the pixel blocks 120 and 130 are groups of pixels in a rectangular shape having as their center actual pixels located on a pair of the horizontal pixel lines La extending on both sides of the interpolation pixel 110, respectively.

With reference to FIGS. 14 to 21, a description will be given of the second example of the diagonal interpolation (hereinafter, "diagonal interpolation 2") performed by the vertical double scaling module 3. Specifically, the diagonal interpolation 2 is performed by the diagonal interpolator 5 and the 1×3 block correlation calculator 7 of the vertical double scaling module 3.

Figure 14:
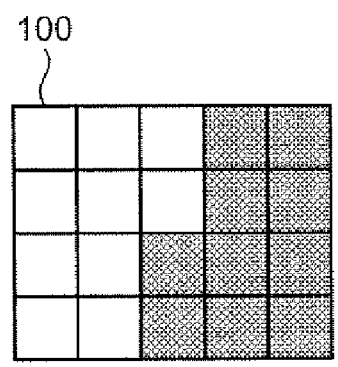
Figure 15:
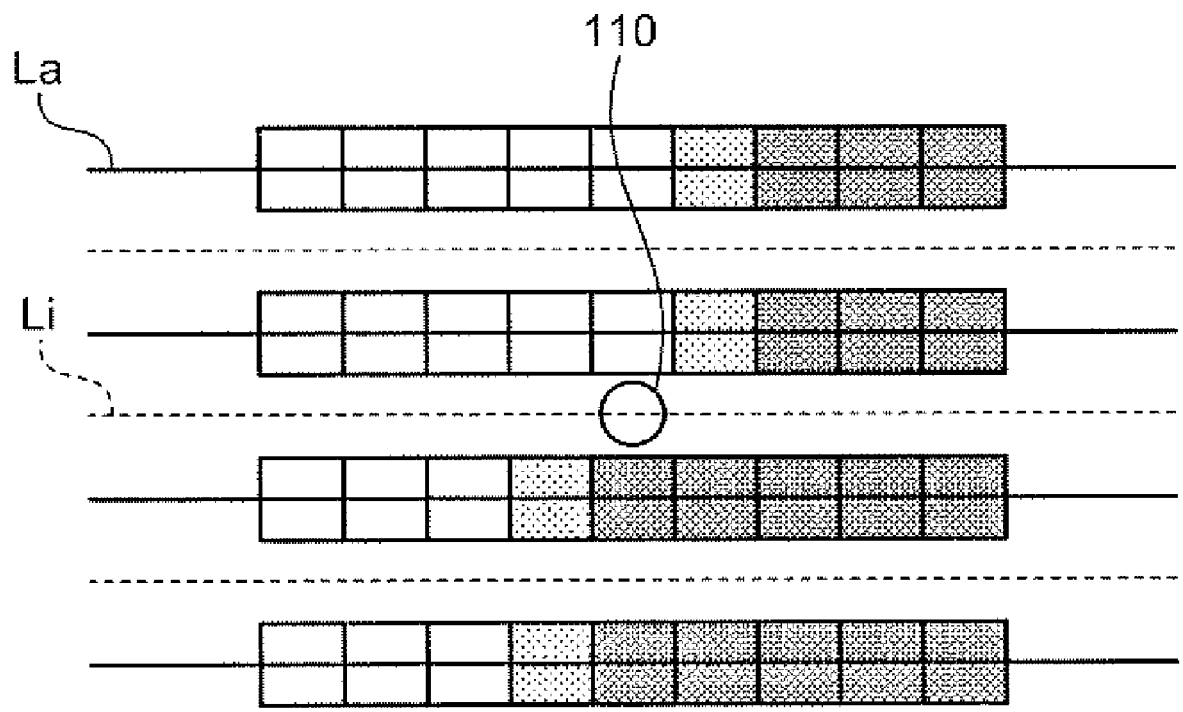

For example, as illustrated in FIG. 14, when an edge extends diagonally at a large angle in an input image, the diagonal interpolation 1 may result in jaggies along the edge. FIG. 15 depicts an image obtained by scaling the image in FIG. 14 to double its size in the horizontal direction. FIGS. 16A, 16B, 17A and 17B depict results of the detection of a correlation in diagonal and vertical directions obtained by applying the diagonal interpolation 1 to the image in FIG. 15.

Figure 16A:
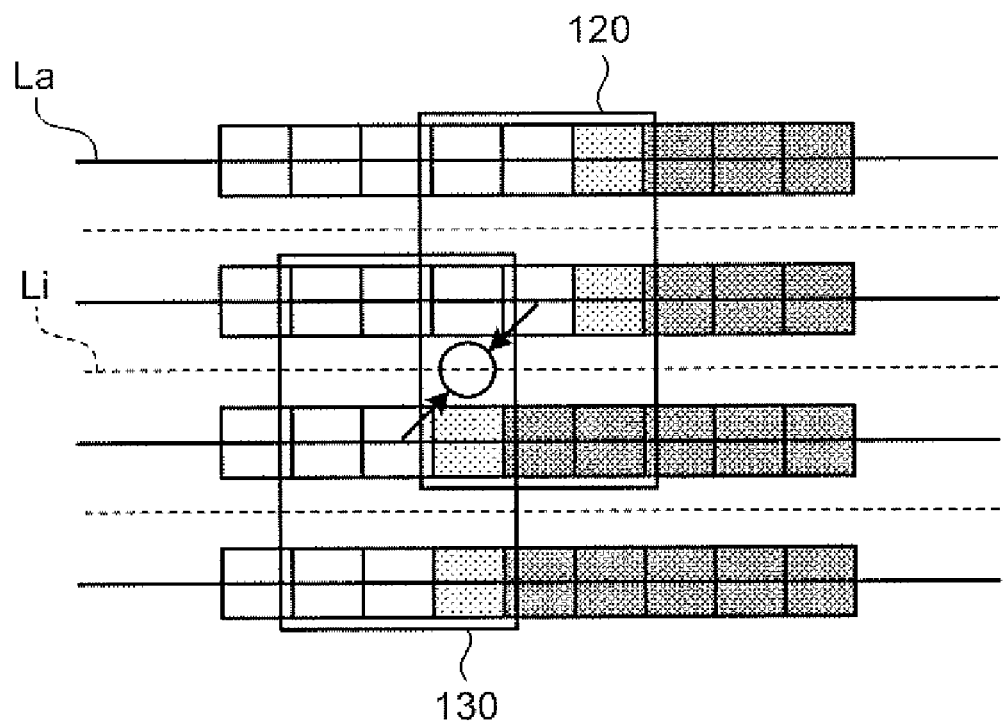
Figure 16B:
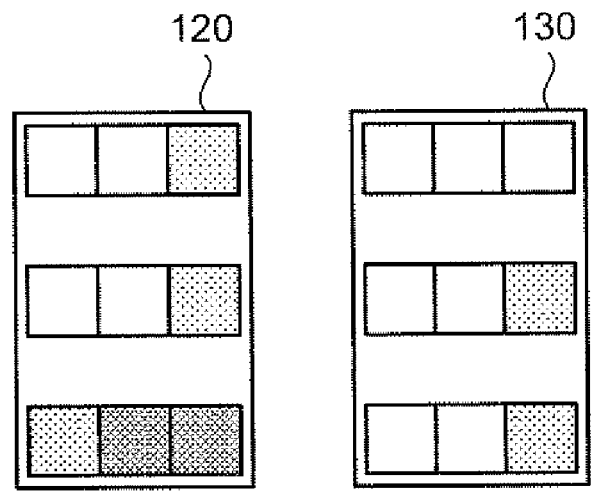
Figure 17A:
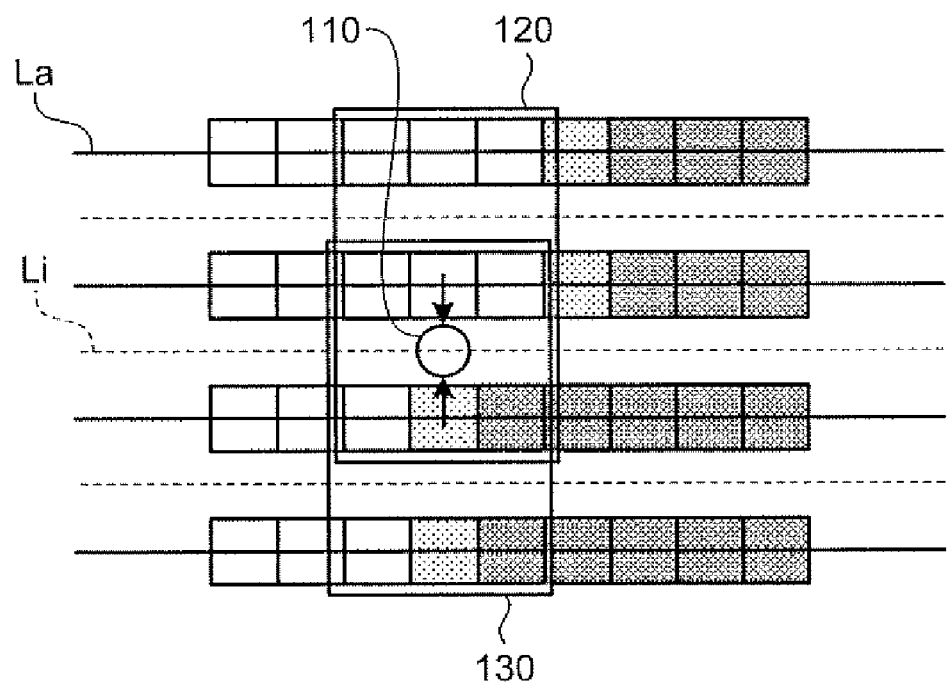
Figure 17B:
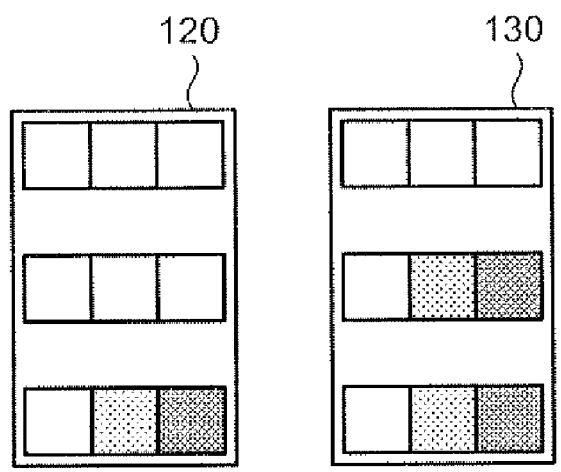
Figure 18:
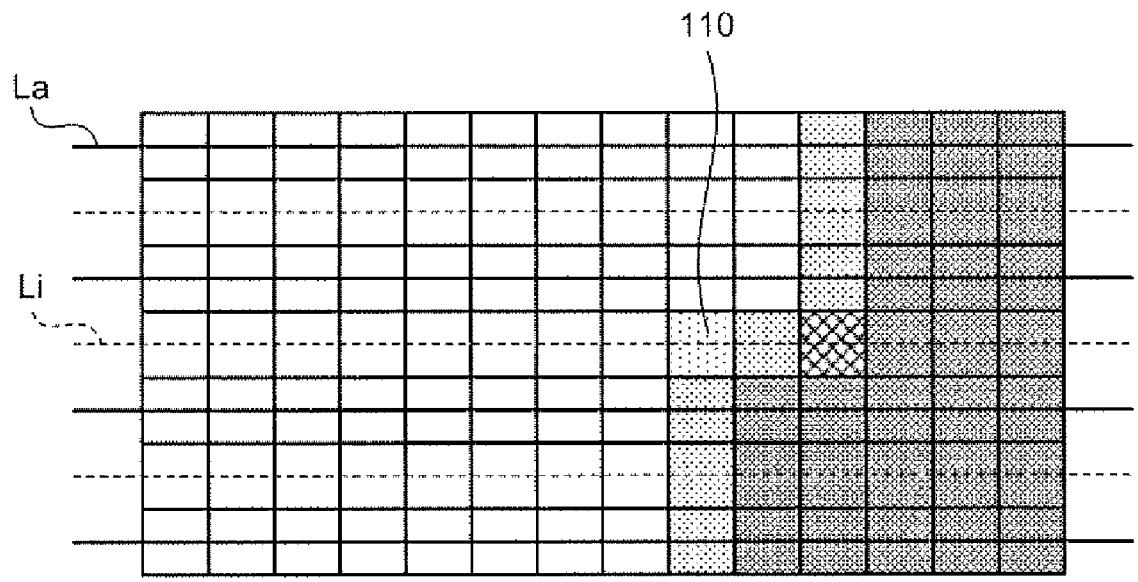

Comparing the image in FIGS. 16A and 16B with that of FIGS. 17A and 17B, the correlation is the highest in the vertical direction. Therefore, if the image in FIG. 15 is scaled to double the size in the vertical direction by the diagonal interpolation 1, the resultant image is as illustrated in FIG. 18. As can be seen from FIG. 18, the diagonal interpolation is not successful, and jaggies occur in the image. This is because the detection of a correlation between the pixel blocks 120 and 130, i.e., 3×3 (3 rows by 3 columns) matrices of pixels, or the diagonal interpolation 1 is not suitable for the case where the inclination angle of the edge is large.

In view of the foregoing, as illustrated in FIG. 2, the image expansion apparatus 1 performs first the diagonal interpolation 1, i.e., detection of a correlation vector by the 3×3 block correlation calculator 6. The image expansion apparatus 1 then performs, only when the correlation vector detected by the diagonal interpolation 1 points in the vertical direction, the diagonal interpolation 2, i.e., detection of a correlation vector by the 1×3 block correlation calculator 7.

In the diagonal interpolation 2, the luminance value of the interpolation pixel 110 is calculated based on the luminance values of 3 pixels arrayed above the interpolation pixel 110 (Pu5 to Pu7 in FIG. 8), and the luminance values of 3 pixels arrayed below the interpolation pixel 110 (Pd5 to Pd7).

Figure 19:
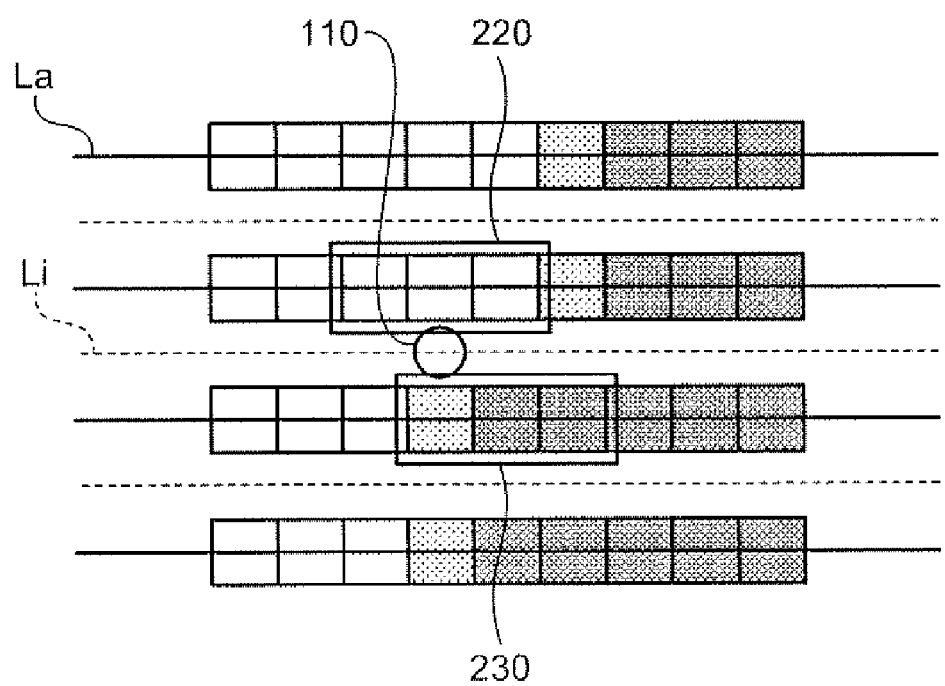

As illustrated in FIG. 19, the 1×3 block correlation calculator 7 sets pixel blocks (second pixel blocks) 220 and 230. The 3×3 block correlation calculator 6 then calculates a correlation between the pixel blocks 220 and 230 for each of 3 directions, and detects the direction in which the correlation between them is the highest.

Assuming that the row direction is horizontal and the column direction is vertical, the pixel blocks 220 and 230 are each a 1×3 (1 row by 3 columns) matrix of pixels. That is, the pixel blocks 220 and 230 are groups of pixels in a rectangular shape having as their center actual pixels located on a pair of the horizontal pixel lines La extending on both sides of the interpolation pixel 110, respectively.

Figure 20:
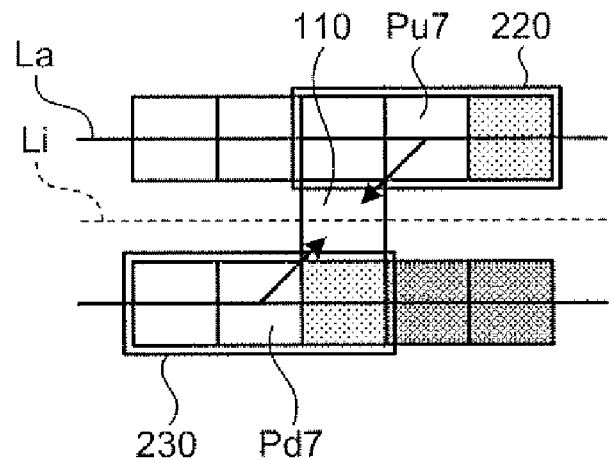

In the 3 directions, the pixel blocks 220 and 230, while being shifted, maintain the relationship that they are opposite with respect to the interpolation pixel 110, and that they are equally distant from the interpolation pixel 110. The 1×3 block correlation calculator 7 calculates a correlation between the pixel blocks 220 and 230 for each of the 3 directions in which they are shifted, and detects the direction in which the correlation between them is the highest. Thus, as illustrated in FIG. 20, the 1×3 block correlation calculator 7 determines the direction in which the correlation between the pixel blocks 220 and 230 is the highest. The 1×3 block correlation calculator 7 outputs information on the direction of the pixel blocks 220 and 230 thus determined as a correlation vector.

Figure 21:
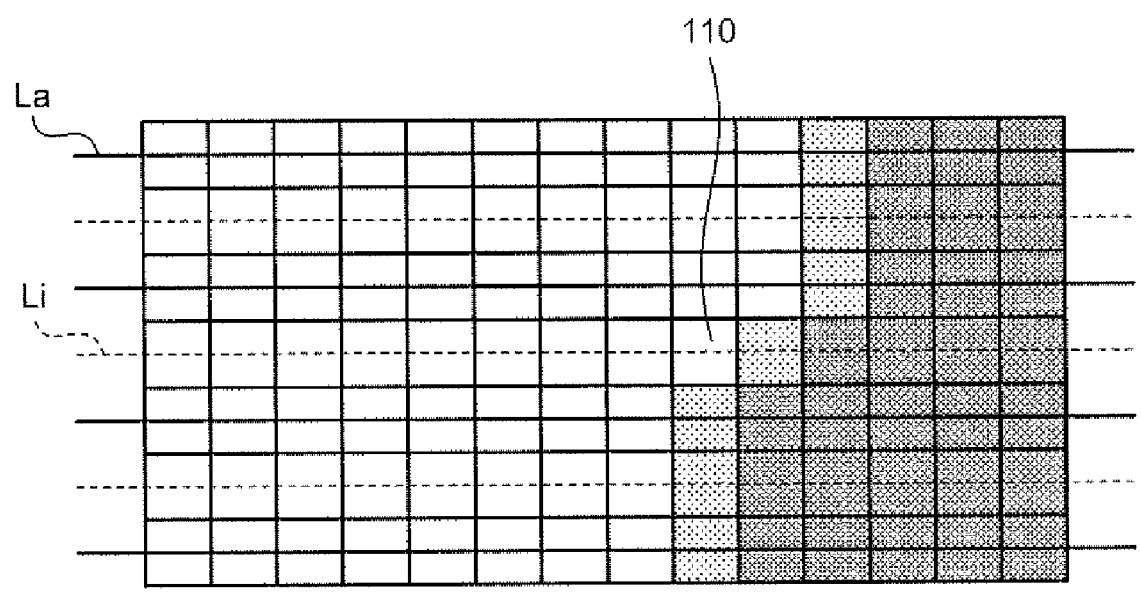

The diagonal interpolator 5 specifies the positions of the pixel blocks 220 and 230 based on the correlation vector calculated by the 1×3 block correlation calculator 7. Subsequently, the diagonal interpolator 5 calculates or interpolates the luminance value of the interpolation pixel 110 based on the pixel values of the pixel blocks 220 and 230 with the highest correlation. More specifically, as illustrated in FIG. 20, the diagonal interpolator 5 calculates the average of the luminance value Pu7 of a pixel in the center of the pixel block 220 and the luminance value Pd7 of a pixel in the center of the pixel block 230 as the luminance value of the interpolation pixel 110. With this, the resultant image obtained by scaling the image in FIG. 15 to double the size in the vertical direction is as illustrated in FIG. 21. Compared to the image in FIG. 18, the image in FIG. 21 has less jaggies.

As described above, the 1×3 block correlation calculator 7 sets the pixel blocks 220 and 230 each containing an actual pixel. The actual pixels are located on a pair of the horizontal pixel lines La extending on both sides of the interpolation pixel 110, respectively. The actual pixels are located opposite with respect to the interpolation pixel 110, and separated from the interpolation pixel 110 by substantially the same distance. The 1×3 block correlation calculator 7 calculates a correlation between the pixel blocks 220 and 230 for each of 3 directions. The 1×3 block correlation calculator 7 detects a pair of actual pixels (the pixels having the luminance values Pu7 and Pd7, respectively, in the above example) as reference pixels in the pixel blocks 220 and 230 with the highest correlation. Then, only when the reference pixels detected by the 3×3 block correlation calculator 6 are located in the vertical direction (i.e., when the correlation vector detected by the diagonal interpolation 1 points in the vertical direction), the diagonal interpolator 5 calculates the luminance value of the interpolation pixel 110 based on the luminance values (the luminance values Pu7 and Pd7 in the above example) of the reference pixels detected by the 1×3 block correlation calculator 7.

As illustrated in FIG. 2, the pixel selector 8 selects as the luminance value of the interpolation pixel 110 the luminance value obtained by the vertical interpolator 4 or that obtained by the diagonal interpolator 5 to create an interpolation line. The line selector 9 selects a horizontal pixel line output from the horizontal double scaling module 2 or that output from the pixel selector 8 to output one of them as output image.

In the image expansion apparatus 1 configured as above, the 3×3 block correlation calculator 6 calculates a correlation between the pixel blocks 120 and 130, i.e., 3×3 (3 rows by 3 columns) matrices of pixels. The 1×3 block correlation calculator 7 calculates a correlation between the pixel blocks 220 and 230, i.e., 1×3 (1 row by 3 columns) matrices of pixels. The diagonal interpolator 5 calculates the luminance value of the interpolation pixel 110 based on the luminance values of reference pixels detected by the 3×3 block correlation calculator 6. On the other hand, only when the reference pixels detected by the 3×3 block correlation calculator 6 are located in the vertical direction, the diagonal interpolator 5 calculates the luminance value of the interpolation pixel 110 based on the luminance values of reference pixels detected by the 1×3 block correlation calculator 7. In this manner, the calculation of a correlation between the pixel blocks 220 and 230 of 1 row by 3 columns (the diagonal interpolation 2) is performed subsequent to the calculation of a correlation between the pixel blocks 120 and 130 of 3 rows by 3 columns (the diagonal interpolation 1). Thus, even if an edge extends diagonally at a large angle in an input image, the diagonal direction of the edge can be accurately detected, and it is possible to prevent jaggies along the angled edge. Thus, according to the embodiment, the pixel value of an interpolation pixel can be prevented from being erroneously determined.

The pixel blocks 120 and 130 are each a 3×3 (3 rows by 3 columns) matrix of pixels. That is, the pixel blocks 120 and 130 are groups of pixels in a rectangular shape having as their center actual pixels located on a pair of the horizontal pixel lines La extending on both sides of the interpolation pixel 110, respectively. Similarly, the pixel blocks 220 and 230 are each a 1×3 (1 row by 3 columns) matrix of pixels. That is, the pixel blocks 220 and 230 are groups of pixels in a rectangular shape having as their center actual pixels located on a pair of the horizontal pixel lines La extending on both sides of the interpolation pixel 110, respectively. By setting such pixel blocks, the process can be simplified.

If the calculation of a correlation between the pixel blocks 220 and 230 of 1 row by 3 columns (the diagonal interpolation 2) is performed from the beginning, accuracy in detecting a correlation in the diagonal direction may be reduced because the pixel blocks are small in size. On the other hand, by only the calculation of a correlation between the pixel blocks 120 and 130 of 3 rows by 3 columns (the diagonal interpolation 1), as described above, accuracy is reduced for detecting a correlation in the diagonal direction about an angled substantially vertical line. In view of this, the calculation of a correlation between the pixel blocks 120 and 130 of 3 rows by 3 columns (the diagonal interpolation 1) is performed in combination with the calculation of a correlation between the pixel blocks 220 and 230 of 1 row by 3 columns (the diagonal interpolation 2). Thus, the correlation can be detected with higher accuracy.

Although the pixel blocks 120 and 130 are described above as 3×3 (3 rows by 3 columns) matrices of pixels, this is intended by way of example only and not limitation. The pixel blocks 120 and 130 may contain any number more than one of rows and columns of pixels. Similarly, although the pixel blocks 220 and 230 are described above as 1×3 (1 row by 3 columns) matrices of pixels, this is intended by way of example only and not limitation. The pixel blocks 220 and 230 may contain any number of rows and columns of pixels as long as the number of rows is less than that of the pixel blocks 120 and 130 and the number of columns is more than one. In addition, the pixel blocks 120 and 130 may not necessarily be groups of pixels in a rectangular shape having as their center actual pixels located on a pair of the horizontal pixel lines La extending on both sides of the interpolation pixel 110, respectively. The same applies to the pixel blocks 220 and 230.

Further, the pixel blocks 120 and 130 may not necessarily be shifted in 11 directions. Similarly, the pixel blocks 220 and 230 may not necessarily be shifted in 3 directions. The number of directions, in which the pixel blocks 120, 130, 220 and 230 is to be shifted, may be determined according to the size of an image or the like.

The image expansion apparatus 1 may further comprise a display panel that displays an image expanded in the horizontal and vertical directions. A description will be given of the image expansion apparatus 1 provided with such a display panel.

Figure 22:
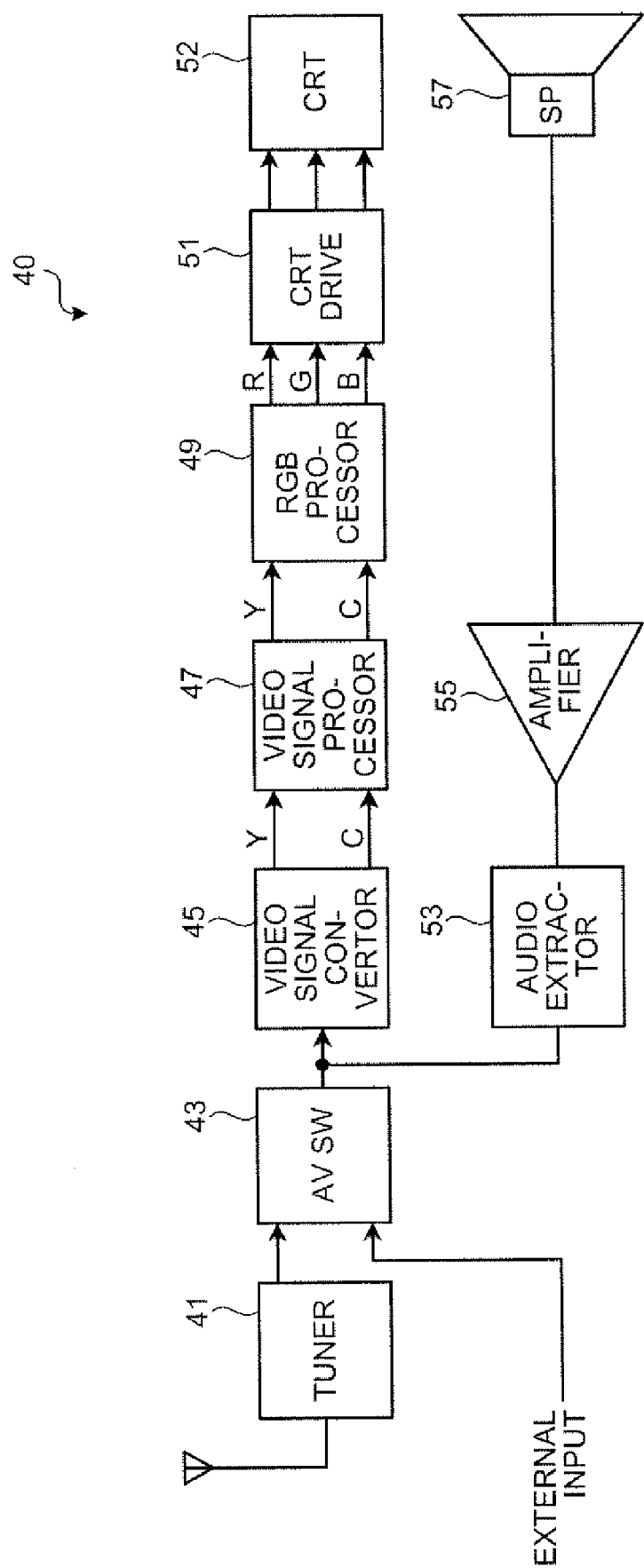
FIG. 22 is an exemplary block diagram of a television apparatus provided with the image expansion apparatus in the embodiment.

FIG. 22 is a block diagram of a television apparatus 40 provided with the image expansion apparatus illustrated in FIG. 1. As illustrated in FIG. 22, the television apparatus 40 comprises a tuner 41, an AV switch (SW) 43, a video signal convertor 45, a video signal processor 47, an RGB processor 49, a CRT drive 51, and a CRT (display panel) 52. The tuner 41 receives a broadcast signal from an antenna element, and demodulates it to output an audio/video signal. The AV switch 43 receives the audio/video signal, and switches between the audio/video signal and external input. Upon receipt of a video signal, the video signal convertor 45 performs predetermined video signal processing on the video signal to convert it into a Y signal and a color difference signal, and outputs them. The television apparatus 40 further comprises an audio extractor 53, an amplifier 55, and a speaker 57. The audio extractor 53 extracts an audio signal from the audio/video signal. The amplifier 55 amplifies the audio signal, and outputs it to the speaker 57.

The image expansion apparatus 1 is applied to the video signal processor 47 that receives the video signal from the video signal convertor 45. Upon receipt of a deinterlaced video signal, the RGB processor 49 separates the deinterlaced video signal into RGB signals. The CRT drive 51 amplifies the RGB signals as required, and the CRT 52 displays the RGB signals as video.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image expansion apparatus comprising:
   a first correlation processor configured to calculate a first correlation between first pixel blocks, and detect as first reference pixels a pair of actual pixels contained respectively in the first pixel blocks where the first correlation is highest, the actual pixels being located on a pair of actual pixel lines extending on both sides of an interpolation pixel, respectively, and being opposite with respect to the interpolation pixel and separated from the interpolation pixel by substantially an equal distance;

a second correlation processor configured to calculate a second correlation between second pixel blocks, and detect as second reference pixels a pair of actual pixels contained respectively in the second pixel blocks where the second correlation is highest; and an interpolation processor configured to calculate a pixel value of the interpolation pixel based on either pixel values of the first reference pixels or pixel values of the second reference pixels, wherein the first pixel blocks each include pixels arranged in a plurality of rows and columns, and the second pixel blocks each include pixels arranged in at least one row less than the rows of the first pixel blocks and a plurality of columns, the rows being arranged in parallel to the actual pixel lines, while the columns being arranged perpendicular to the actual pixel lines, and the interpolation processor is configured to calculate, when the first reference pixels are located perpendicular to the actual pixel lines, the pixel value of the interpolation pixel based on the pixel values of the second reference pixels.

2. The image expansion apparatus of claim 1, wherein the pixels of the second pixel blocks are arranged in one row and a plurality of columns.

3. The image expansion apparatus of claim 1, wherein the first pixel blocks are groups of pixels in a rectangular shape having the actual pixels, respectively, at center thereof, and the second pixel blocks are groups of pixels in a rectangular shape having the actual pixels, respectively, at center thereof.

4. The image expansion apparatus of claim 1, further comprising a display panel configured to display an image containing the interpolation pixel with the pixel value obtained by the interpolation processor.

5. An image expansion method comprising:

calculating a first correlation between first pixel blocks, and detecting as first reference pixels a pair of actual pixels contained respectively in the first pixel blocks where the first correlation is highest, the actual pixels being located on a pair of actual pixel lines extending on both sides of an interpolation pixel, respectively, and being opposite with respect to the interpolation pixel and separated from the interpolation pixel by substantially an equal distance;

calculating a second correlation between second pixel blocks, and detecting as second reference pixels a pair of actual pixels contained respectively in the second pixel blocks where the second correlation is highest; and calculating a pixel value of the interpolation pixel based on either pixel values of the first reference pixels or pixel values of the second reference pixels, wherein the first pixel blocks each include pixels arranged in a plurality of rows and columns, and the second pixel blocks each include pixels arranged in at least one row less than the rows of the first pixel blocks and a plurality of columns, the rows being arranged in parallel to the actual pixel lines, while the columns being arranged perpendicular to the actual pixel lines, and when the first reference pixels are located perpendicular to the actual pixel lines, the pixel value of the interpolation pixel is calculated based on the pixel values of the second reference pixels.

* * * * *